United States Patent
Boscan Guerra

(10) Patent No.: US 12,122,923 B2
(45) Date of Patent: Oct. 22, 2024

(54) AMINE-BASED PRIMER COATINGS FOR ELECTROPHOTOGRAPHIC PRINTING

(71) Applicant: Michelman, Inc., Cincinnati, OH (US)

(72) Inventor: Freddy Enrique Boscan Guerra, Recklinghausen (DE)

(73) Assignee: Michelman, Inc., Cincinnati, OH (US)

( * ) Notice: Subject to any disclaimer, the term of this patent is extended or adjusted under 35 U.S.C. 154(b) by 766 days.

(21) Appl. No.: 17/276,945

(22) PCT Filed: Jul. 15, 2020

(86) PCT No.: PCT/US2020/042067
§ 371 (c)(1),
(2) Date: Mar. 17, 2021

(87) PCT Pub. No.: WO2021/011610
PCT Pub. Date: Jan. 21, 2021

(65) Prior Publication Data
US 2022/0033674 A1    Feb. 3, 2022

(30) Foreign Application Priority Data

Jul. 18, 2019  (LU) ........................................ 101319

(51) Int. Cl.
| | |
|---|---|
| C09D 5/02 | (2006.01) |
| C09D 5/00 | (2006.01) |
| C09D 11/10 | (2014.01) |
| C09D 11/38 | (2014.01) |
| C09D 11/54 | (2014.01) |
| C09D 133/14 | (2006.01) |
| G03G 9/08 | (2006.01) |
| G03G 15/16 | (2006.01) |

(52) U.S. Cl.
CPC .............. *C09D 11/10* (2013.01); *C09D 5/002* (2013.01); *C09D 5/022* (2013.01); *C09D 11/38* (2013.01); *C09D 11/54* (2013.01); *C09D 133/14* (2013.01); *G03G 9/0823* (2013.01); *G03G 15/162* (2013.01)

(58) Field of Classification Search
CPC .............................. G03G 9/0823; C09D 11/10
See application file for complete search history.

(56) References Cited

U.S. PATENT DOCUMENTS

| | | |
|---|---|---|
| 5,134,054 A | 7/1992 | Iwasawa et al. |
| 5,422,222 A | 6/1995 | Akaki et al. |
| 7,951,518 B2 | 5/2011 | Ono et al. |
| 8,333,832 B2 | 12/2012 | Maennig et al. |
| 8,476,334 B2 | 7/2013 | Illsley et al. |
| 9,921,502 B2 | 3/2018 | Mikami et al. |
| 2004/0121173 A1 | 6/2004 | St. Arnauld |
| 2005/0032931 A1* | 2/2005 | Naisby ................... B41M 5/502 |
| | | 523/160 |

FOREIGN PATENT DOCUMENTS

| | | | | |
|---|---|---|---|---|
| JP | 2002-301867 | * | 10/2002 | .............. B41M 5/00 |
| JP | 2005-103888 | * | 4/2005 | .............. B41M 5/00 |
| WO | 2009007232 A1 | | 1/2009 | |

OTHER PUBLICATIONS

Translation of JP 2002-301867.*
Translation of JP 2005-103888.*

* cited by examiner

*Primary Examiner* — Peter L Vajda
(74) *Attorney, Agent, or Firm* — Vorys, Sater, Seymour and Pease LLP

(57) ABSTRACT

Electrophotographic printing techniques offer excellent image quality, but image adhesion to a desired substrate may be problematic in many instances. Primer coatings for improving image adhesion to a substrate may be formed from primer compositions comprising a fluid and an amine-functionalized copolymer dispersed in the fluid as an emulsion, in which the amine-functionalized copolymer has an amine number of about 10 to about 180 mg KOH/g copolymer. The fluid may be aqueous or organic. Suitable amine-functionalized copolymers may be formed by an emulsion polymerization reaction of one or more first ethylenically unsaturated monomers lacking an amine group and one or more second ethylenically unsaturated monomers bearing at least one amine group. The at least one amine group comprises a side chain of the amine-functionalized copolymer.

24 Claims, No Drawings

AMINE-BASED PRIMER COATINGS FOR ELECTROPHOTOGRAPHIC PRINTING

BACKGROUND

On-demand digital printing machines based on liquid electrophotographic systems are widely used in modern laser printing and copy machine systems. Electrophotographic systems form a latent image on a photosensitive drum, and a liquid toner is then applied to the latent image on the drum to form a physical image for subsequent transfer. HP ELECTROINK, an ethylene/acrylic copolymer composition, is one example of a liquid toner system in common use. Following toner exposure, the image is then electrically transferred onto an intermediate transfer blanket or belt for printing to a fibrous substrate, such as paper or a polymeric film substrate. Although a high image quality may be achieved with liquid electrophotographic printing, the transferred images usually do not adhere well to the fibrous substrate unless the substrate has been previously treated with a suitable primer coating. The primer coating is usually chosen to include functional groups suitable for promoting chemical interactions with complementary organic functional groups in the toner to facilitate strong chemical adhesion of the toner to the surface of the substrate. Proper substrate adhesion is also an important element of a primer coating.

Toner adhesion failure may occur for any number of reasons. In one instance, incomplete fusion of toner particles upon the surface of the substrate may lead to poor adhesion. Even more commonly, the toner particles within the transferred image may interact only weakly with the substrate or a primer coating thereon, thereby resulting in poor surface adhesion. If there are limited chemical interactions between the toner particles and a primer coating, the toner adhesion may be poor. Accordingly, the functional groups present within a primer coating may be chosen to promote strong chemical interactions such as, for example, hydrogen bonding or salt bridge formation, with complementary functional groups within the toner. Functional groups such as carboxylates, amines, and alcohols may be particularly suitable in this regard, since these types of functional groups may both donate and receive hydrogen bonds. If the primer coating is overly hydrophilic due to the presence of excessive functional groups capable of donating or receiving hydrogen bonds, the primer coating may have poor resistance to water. In addition to their poor water resistance, some polymers having an excessive amount of amine functional groups may be mildly corrosive and/or subject to discoloration (particularly yellowing) over time, thereby limiting their applicability in spite of providing good toner adhesion in many cases.

DETAILED DESCRIPTION

The present disclosure generally relates to primer compositions for liquid electrophotographic printing and, more specifically, to primer compositions and primer-coated substrates featuring a polymer having a specified amine content and methods for production thereof.

As discussed above, liquid electrophotographic printing is a very powerful image forming technique. However, transfer of electrophotographic images onto certain substrates may be problematic due to poor image adhesion to the surface of the substrate, Substrate adhesion may be problematic in some instances as well. Primer coatings may be employed to improve image adhesion to a substrate, but some primer coatings may exhibit limited water resistance or undergo discoloration over time, thereby limiting their practical use.

The present disclosure describes primer compositions that may be employed to form primer coatings upon various substrates, including polymeric and paper substrates. The primer compositions disclosed herein feature an amine-functionalized copolymer having a sufficient number of amine groups upon side chains to promote toner adhesion, particularly HP ELECTROINK toner, while limiting the amount of amine groups at or below a loading where coating robustness (due to excessive water solubility) or discoloration becomes problematic over time. In particular, the primer compositions disclosed herein feature an amine-functionalized copolymer having an amine number of about 10 to about 180 mg KOH/g copolymer. The amine-functionalized copolymer may be a copolymer of two or more ethyleneically unsaturated monomers, wherein the ethylenic unsaturation may undergo polymerization to produce a saturated polymer backbone derived from each monomer and at least one of the monomers bears an amine-containing side chain. Amine number may be calculated or determined experimentally, as specified below.

In the disclosure herein, "amine number" may be determined by taking the weight fraction of amine-containing monomer in the amine-functionalized copolymer, dividing by the molecular weight of the amine-containing monomer, multiplying by the molecular weight of KOH, and finally multiplying the result by 1000. The empirical amine number also may be verified experimentally by conducting a potentiometric titration, for example. In calculating the amine number, the weight fraction of amine-containing monomer may be revised for calculational purposes if not all of the amines are present as free amines. As used herein, "free amines," but not amine salts, contribute to the "amine number." The term "free amines" refers to any primary, secondary or tertiary amine in which an unbonded lone pair of electrons is present, such that the amine is not protonated or quaternized and bears a positive charge. That is, a "free amine" maintains its basicity. It is to be appreciated that protonated, quaternized, and/or similarly functionalized amine groups may be present in the primer compositions disclosed herein in addition to free amines, provided that the amount of free amines remains sufficient to place the amine number in the foregoing range. Amine protonation may arise from an externally added acid and/or from the presence of olefinically unsaturated monomers bearing an acidic side chain, as discussed further below. The effect of an acid or quaternizing group in lowering the amine number may be determined by calculating the number of moles of acid or quaternizing group present, subtracting from the number of moles of amine-containing monomer present, and then calculating the amine number as above. Amine derivatives, such as amides, that are no longer basic likewise do not contribute to the amine number in the disclosure herein.

As a non-limiting example, an amine number of about 10 mg KOH/g polymer to about 180 mg KOH/g polymer corresponds to a loading of about 3 wt. % to about 52 wt. % for an amine-functionalized copolymer bearing the amine-containing monomer dimethylaminoethyl methacrylate, provided that none of the amine groups are protonated (e.g., from externally added acid and/or monomers bearing an acidic side chain). In the absence of monomers bearing an acidic side chain and/or functionalization that eliminates basicity of an amine group, there may be a direct correlation between the amine number and the weight percentage of amine-containing monomer present, provided that the pH is sufficiently high for the amine groups to remain substantially deprotonated.

Monomers bearing an acidic side chain, such as a carboxylic acid or a sulfonic acid, may be present in the amine-functionalized copolymers, provided that the amount of such acidic monomers is sufficiently small that the amine number remains in the foregoing range (i.e., such that a sufficiently small number of amine groups are internally protonated by the acidic groups). If the amount of acidic monomers is too large for the number of amine groups present, the amine number may decrease to such an extent that poor toner adhesion to the primer coating occurs. It may be desirable to incorporate a limited amount of carboxylic acid groups in the amine-functionalized copolymers to promote adhesion of the primer coating itself to particular types of substrates, such as paper substrates, for example. Carboxylic acid groups may also improve compatibility with additives conventionally used in the printing industry. By the same token, it may be desirable to limit the overall number of amine groups in the amine-functionalized copolymers to avoid discoloration and excessive hydrophilicity. Thus, striking a balance between substrate adhesion and toner adhesion may be accomplished through judicious consideration of how a suitable amine number is achieved, as provided in the disclosure herein.

The primer compositions disclosed here may offer several advantages compared to polyethyleneimine, which has been used previously within primer coatings to promote toner adhesion, including for HP INDIGO toner. The amine-functionalized copolymers of the present disclosure may be formulated such that they have considerably fewer amine groups than does polyethyleneimine, thereby decreasing susceptibility of the primer coating toward water degradation and/or discoloration over time. Otherwise, there is considerable structural tolerance in the amine-functionalized copolymers disclosed herein, provided that the amine number remains within the foregoing range.

The primer compositions described herein may be easily prepared by emulsion polymerization techniques through combining one or more first ethylenically unsaturated monomers lacking an amine group with one or more second ethylenically unsaturated monomers comprising at least one amine group. A single monomer of each type or multiple monomers of each type may undergo polymerization in the disclosure herein. The ratio (molar or weight ratio) between the first ethylenically unsaturated monomer(s) and the second ethylenically unsaturated monomer(s) may be easily varied to tailor the amine number and/or hydrophobicity of the resulting copolymer in the primer compositions, as non-limiting examples. The presence of both hydrophilic and hydrophobic monomers in the copolymer may aid in promoting toner adhesion and chemical resistance, in a non-limiting example. Although polymerization techniques other than emulsion polymerization may be used to prepare the copolymers of the present disclosure, as-produced copolymer emulsions may be advantageous, since they may be directly deposited to form a primer coating upon a desired substrate, optionally after combining a polyvalent metal salt for facilitating inkjet printing. The copolymer emulsions are also compatible with various types of starches for promoting deposition of primer coatings upon paper substrates, as a non-limiting example.

The primer composition described herein and the primer coatings formed therefrom may be particularly effective for promoting adhesion of HP INDIGO toners. Adhesion may be assayed relatively using a tape pull test, such as that specified in ASTM F2252/F2252M and described further herein in modified form. Advantageously, the primer compositions described herein demonstrate very limited adhesion variability between different colors of HP INDIGO toners, in contrast to many other types of primer compositions. Namely, the primer coatings of the present disclosure afford comparable adhesion between black toners and colored toners. With other types of primer coatings, it may be difficult to pass a tape pull test with both types of toner.

Accordingly, primer compositions of the present disclosure may comprise a fluid, particularly an aqueous fluid, and an amine-functionalized copolymer dispersed in the fluid. The amine-functionalized copolymer comprises a polymerized reaction product of one or more first ethylenically unsaturated monomers lacking an amine group and one or more second ethylenically unsaturated monomers bearing at least one amine group, such that the at least one amine group comprises a side chain of the amine-functionalized copolymer. The amine-functionalized copolymer further has an amine number of about 10 to about 180 mg KOH/g copolymer, or about 30 to about 160 mg KOH/g copolymer, or about 50 to about 60 mg KOH/g copolymer, or about 60 to about 80 mg KOH/g copolymer, or about 80 to about 100 mg KOH/g copolymer, or about 100 to about 115 mg KOH/g copolymer, or about 115 to about 130 mg KOH/g copolymer, or about 130 to about 150 mg KOH/g copolymer. Other examples of such amine-functionalized copolymers may have an amine number of about 70 to about 140 mg KOH/g copolymer. The amine number range represents a compromise between providing particularly effective toner and substrate adhesion at the low end of the range while not providing an overly hydrophilic amine-functionalized copolymer at the high end of the range (i.e., trending toward excessive water solubility). The primer compositions disclosed herein may be particularly suitable for use in liquid electrophotographic printing.

The amine-functionalized copolymer may be dissolved in the aqueous fluid or dispersed as an emulsion in the aqueous fluid. Emulsions prepared in essentially organic media (e.g., water-in-oil emulsions) also reside within the scope of the present disclosure. Advantageously, the amine-functionalized copolymers may be readily prepared using emulsion polymerization, discussed in further detail below, to form the primer compositions directly as an emulsion polymerization reaction mixture. Other polymerization techniques suitable for use in the disclosure herein include, for example, bulk polymerization or solution polymerization. In any polymerization technique, polymerization may be initiated with a suitable radical initiator, illustrative examples of which are provided hereinbelow.

More specific examples of the primer compositions disclosed herein may comprise an emulsion-polymerized amine-functionalized copolymer dispersed as an emulsion within an aqueous fluid. The amine-functionalized copolymer comprises a polymerized reaction product of one or more first ethylenically unsaturated monomers lacking an amine group and one or more second ethylenically unsaturated monomers bearing at least one amine group, such that the at least one amine group comprises a side chain of the amine-functionalized copolymer and the amine-functionalized copolymer further has an amine number of about 70 to about 140 mg KOH/g copolymer and a glass transition temperature of about 0° C. to about 50° C. Other specific examples may comprise an amine-functionalized copolymer having an amine number ranging from about 10 to about 180 mg KOH/g copolymer and a glass transition temperature of about 0° C. to about 50° C., or any other suitable range of amine numbers disclosed herein. Glass transition temperatures ($T_g$) may be determined via differential scanning calorimetry using a DSC 3+ instrument (Mettler Toledo) and employing a scanning cycle consisting of an initial cooling to −60° C. at a 20° C./min ramp, a stabilizing period of 5 minutes at this temperature, heating at a ramp of 20° C./min up to a temperature of 120° C./min, and a second stabilizing period of 5 minutes at this temperature.

Aqueous fluids suitable for use in the present disclosure may comprise water or water admixed with a water-miscible organic solvent, such as an alcohol or glycol.

The aqueous fluid in the present disclosure may have a non-acidic pH in order to maintain the amine number of the amine-functionalized copolymers within the foregoing ranges. That is, the aqueous fluid may have a pH of about 7 or greater in the present disclosure. In more particular examples, the aqueous fluid may have a pH ranging from about 7 to about 10, or about 7.5 to about 10, or about 8 to about 10, or about 8.5 to about 10, or about 9 to about 10, or about 9.5 to about 10, or about 7.5 to about 9.5, or about 7.5 to about 9, or about 7.5 to about 8.5, or about 7.5 to about 8, or about 8 to about 9.5, or about 8 to about 9, or about 8 to about 8.5, or about 8.5 to about 9.5, or about 8.5 to about 9. At the foregoing pH values, the amine groups in the amine-functionalized copolymer may be fully deprotonated and each contribute to the amine number. The pH values in the present disclosure may be measured at room temperature with a glass electrode employing a 1 M KCl electrolyte solution, calibrated using pH 4, pH 7 and pH 10 standards prior to use. A SENSION+ PH3 instrument from Hach was used.

At pH values below 7, a portion of the amine groups may be protonated and decrease the amine number below that theoretically possible based on the total number of amine groups present. Provided that the amine number remains within the ranges specified above, pH values below 7 may also be tolerable in the disclosure herein. As also specified below, ethylenically unsaturated monomers bearing an acidic group may also be present in limited amounts and similarly decrease the amine number below that theoretically possible based on the total number of amine groups present.

Ethylenically unsaturated monomers comprising at least one amine group may suitably comprise any one or more of a primary amine, a second amine or a tertiary amine. The at least one amine group may be appended to the ethylenically unsaturated monomers in a manner such that the at least one amine becomes incorporated as a side chain of the amine-functionalized copolymer once copolymerization with the ethylenically unsaturated monomers) lacking an amine group has taken place. Particular examples of ethylenically unsaturated monomers comprising at least one amine group that may be suitable for use in the disclosure herein include, for example, 2-(dimethylamino)ethyl methacrylate, 3-(dimethylamino)propyl methacrylate, 2-(diethylamino)ethyl methacrylate, 3-(diethylamino)propyl methacrylate, 2-(ethylamino)ethyl methacrylate, 3-(ethylamino)propyl methacrylate, 2-(methylamino)ethyl methacrylate, 3-(methylamino)propyl methacrylate, 2-(tert-butylamino)ethyl methacrylate, 3-(tert-butylamino)propyl methacrylate, 2-(dimethylamino)ethyl methacrylamide, 3-(dimethylamino)propyl methacrylamide, 2-(diethylamino)ethyl methacrylamide, 3-(dimethylamino)propyl methacrylamide, 2-(methylamino)ethyl methacrylamide, 3-(methylamino)propyl methacrylamide, 2-(ethylamino)ethyl methacrylamide, 3-(ethylamino)propyl methacrylamide, 2-(tert-butylamino)ethyl methacrylamide, 3-(tert-butylamino)propyl methacrylamide, vinyl amine, allyl amine, and any combination thereof. The corresponding acylamide-based monomers may also be suitable in certain circumstances, particularly 2-(dimethylamino)ethyl acrylate. Thus, in any embodiment of the present disclosure, the one or more second ethylenically unsaturated monomers bearing at least one amine group may comprise an acrylamide or methacrylamide monomer bearing at least one amine group. In particular examples, all of the one or more second ethylenically unsaturated monomers may be acrylate or methacrylate monomers bearing an amine group.

Suitable examples of ethylenically unsaturated monomers lacking an amine group are not considered to be particularly limited. Particular examples may include, for example, esters of acrylic or methacrylic acid, such as n-butyl (meth)acrylate, methyl (meth)acrylate, ethyl (meth)acrylate, 2-ethylhexyl (meth)acrylate, cycloalkyl (meth)acrylates such as isobornyl (meth)acrylate and cyclohexyl (meth)acrylate; styrene or substituted variants thereof; dienes such as 1,3-butadiene or isoprene; vinyl esters, such as vinyl acetate, vinyl alkanoates or their derivatives; nitriles, such as (meth)acrylonitrile; acrylamides or methacrylamides; olefinically unsaturated halides, such as vinyl chloride; alpha olefins; or any combination thereof. Still other examples of suitable ethylenically unsaturated monomers lacking an amine group that may be present in the amine-functionalized copolymers include, for example, hydroxy-functionalized monomers such as hydroxyethyl (meth)acrylate or hydroxylpropyl (meth)acrylate; (meth)acrylamide derivatives such as N-methylol (meth)acrylamide and diacetone acrylamide; polyvinyl monomers, such as allyl methacrylate, divinyl benzene, and various alkylene glycol di(meth)acrylates.

When present, suitable alpha olefins that may be incorporated in the amine-functionalized copolymers include, but are not limited to, ethylene, propylene, isobutylene, 1-butene, 1-pentene, 1-hexene, 4-methyl-1-pentene, 1-octene, 1-decene, 1-dodecene, 1-tetradecene, or combinations thereof. Linear alpha olefins having an even number of carbon atoms may be particularly suitable due to their ready commercial availability.

Particularly suitable examples of amine-functionalized copolymers may contain about 1 wt. % to about 60 wt. % of the olefinically unsaturated monomers comprising at least one amine group. In more specific examples, about 5 wt. % to about 45 wt. %, or about 10 wt. % to about 40 wt. %, or about 10 wt. % to about 25 wt. %, or about 25 wt. % to about 40 wt. % of the olefinicially unsaturated monomers comprising at least one amine group may be present.

Still more specific examples of suitable amine-functionalized copolymers may comprise about 60 wt. % to about 100 wt. % acrylate or methacrylate monomers, and about 40 wt. % or less ethylenically unsaturated monomers that are not an acrylate or methacylate monomer. Some amine-functionalized copolymers of the present disclosure may comprise all acrylate or methacrylate monomers, in which case a first portion of the acrylate or methacrylate monomers may contain at least one amine group and a second portion of the acrylate or methacrylate monomers may lack an amine group. Optionally, a third portion of acrylate or methacrylate monomers may bear a side chain carboxylic acid or sulfonic acid in amine-functionalized copolymers comprising all acrylate or methacrylate monomers, as specified below.

As mentioned above, the amine-functionalized copolymers may further comprise at least one monomer unit bearing a side chain carboxylic acid or sulfonic acid, provided that the amount of such acid-containing monomer units leaves the amine number in a range disclosed above. Suitable acid-containing monomers, when present, include ethylenic unsaturation and are copolymerizable with the first and second ethylenically unsaturated monomers discussed previously. Illustrative examples may include, but are not limited to, acrylic acid, methacrylic acid, maleic acid, methyl hydrogen maleate, ethyl hydrogen maleate, itaconic acid, fumaric acid, crotonic acid and citraconic acid. Suitable monomers containing a sulfonic acid group may include, for example, styrenesulfonic acid or 2-aminomethylpropanesulfonic acid derivatized with a vinyl group. It is to be appreciated that hydrolysable monomers may be used in a similar manner to introduce a side-chain carboxylic acid group into the amine-functionalized copolymers. Suitable hydrolysable monomers may include, for example, methyl acrylate, ethyl acrylate, methyl methacrylate, ethyl methacrylate, isobutyl acrylate, isobutyl methacrylate, methyl fumarate, vinyl acetate, vinyl propionate, vinyl benzoate, vinyl chloride, vinylidene chloride, acrylamide, acrylonitrile, methacrylamide, methacrylonitrile, fumaronitrile, and the like. It is also to be appreciated that carboxylic acid or sulfonic acid functionalization of the polymer may take place through a synthetic transformation of a polymer side chain following polymerization, if desired or synthetically feasible.

When present, acid-containing monomers bearing ethylenic unsaturation may be present in the amine-functionalized copolymer in an amount under 10 wt. %, such as about 0.1 wt. % to about 1 wt. %, or about 1 wt. % to about 5 wt. %, or about 5 wt. % to about 10 wt. %. An acid-containing monomer that is acrylic acid, methacrylic acid, or any derivative thereof may be copolymerized with other monomers that are all acrylates or methacrylates in some examples. In other examples, an acid-containing monomer that is not an acrylate or methacrylate may be copolymerized with other monomers that are all acrylates or methacrylates. In still other examples, an acid-containing monomer that is not an acrylate or methacrylate may be copolymerized with other monomers that are not all acrylates or methacrylates, but preferably at least a portion of the other monomers are acrylates or methacrylates.

The primer compositions of the present disclosure may further comprise a surfactant or another suitable wetting agent. Suitable surfactants may include, for example, neutral surfactants (including zwitterionic surfactants and uncharged surfactants) and anionic surfactants. Cationic surfactants, in contrast, may prove synthetically challenging during emulsion polymerization and disrupt adhesion between the toner particles and the primer coating. However, in certain circumstances, even cationic surfactants may be suitably used in the present disclosure.

Suitable neutral surfactants may include, for example, alkylaryl polyether alcohols, alkylphenol ethoxylates, alkyl ethoxylates, polyethylene sorbitan fatty acid esters, and mixtures thereof. When present, neutral surfactants of these types may be present in the primer compositions of the present disclosure in an amount ranging from about 0.5 wt. % to about 2.0 wt. % based on total monomers. Other suitable neutral surfactants for use in the primer compositions disclosed herein include, for example, poloxamers, fatty acid esters, fatty acid glycerol esters, fatty acid sorbitol esters, and the like. Other neutral surfactants may include, for example, emulsifying agents such as lecithin or glycerol esters, or polymer colloids such as polyvinyl alcohol, polyvinylpyrrolidone, hydroxyethylcellulose, other cellulose derivatives, and the like. Zwitterionic surfactants that may be suitable for use in the disclosure herein include, for example, betaines and sultaines.

Suitable anionic surfactants for use in the disclosure herein may include, for example, alkyl ethoxylate sulfates and sulfonates, alkylphenol ethoxylate sulfates and sulfonates, alkylsulfates, alkylsulfonates, alkylaryl sulfonates, sulfosuccianates, and mixtures thereof. When present, anionic surfactants of these types may be present in the primer compositions of the present disclosure in an amount ranging from about 0.02 wt. % to about 0.5 wt. % based on total monomers. Other anionic surfactants suitable for use in the primer compositions disclosed herein include, for example, carboxylate salts of long-chain fatty adds, such as dodecanoic add, stearic add, oleic add, palmitic add, or the like or phosphate esters of long-chain alcohols.

The primer compositions of the present disclosure are compatible with starch, and starch may be included in the primer compositions, if desired, for promoting toner binding to paper substrates. Suitable starches may include, for example, a modified starch, such as an ionic starch, an oxidized starch, an ethoxylated starch, a hydroxylalkylated starch, a carboxylated starch, an aminated starch, the like or any combination thereof. The starches may be chemically modified through oxidation, acid thinning, or functionalization, or enzymatically modified. The starch may come from any plant source including corn, potato, sweet potato, wheat, rice, sago, tapioca, waxy maize, sorghum, high amylose corn, or the like. When present, the starch may be included in the primer compositions in a greater amount by weight than is the amine-functionalized copolymer. In illustrative examples, starch may be present in the primer compositions in an amount ranging from about 50 wt. % to about 95 wt. % of the total solids in the primer compositions. Choice of a particular starch may be unrelated to the primer composition itself and may be dictated by other variables associated with a printing process. Considerations for choosing a particular starch will be familiar to one having ordinary skill in the art.

Other adhesion promoters differing from the amine-functionalized copolymer may also be suitably present in the primer compositions disclosed herein. In addition to starch, other suitable adhesion promoters may include, for example, polyvinyl alcohol, styrene-butadiene rubber (SBR), polyethyleneimine, polyurethanes, polyvinylpyrrolidone, carboxymethyl cellulose, guar, natural gums, cellulose ethers, urea, stearates, hydrogenated hydrocarbon rosin or rosin esters, acrylic polymer dispersions, the like, and any combination thereof. The adhesion promoter may be present in an amount ranging from about 10 wt. % to about 90 wt. % on a solids basis. When present, the adhesion promoter may be present in an amount such that the adhesion promoter: amine-functionalized copolymer ratio ranges from about 1:5 to 5:1, or about 1:1 to 5:1, or about 1:5 to 1:1. Without being bound by theory, the adhesion promoter may aid in promoting adhesion of the primer coating to the substrate and/or promoting adhesion of the toner to the primer coating.

Still other additives that may be present in the primer compositions disclosed herein include, for example, pigments, dyes, optical brighteners, crosslinkers, defoamers, anti-static agents, dispersants, thickeners, waxes, fillers, biocides, rheology modifiers, preservatives and any combination thereof.

Provided that the amine number remains within the foregoing ranges from above, the amine groups may include both protonated and unprotonated amines, and/or at least a portion of the amines may be functionalized to form quaternized amine groups or amine derivatives no longer having a lone pair or electrons (e.g., amides, ureas, urethanes, or the like). In particular instances, the amine-functionalized copolymer may comprise a first portion of amine groups that are protonated and a second portion of amine groups that are unprotonated. In other instances, the amine-functionalized copolymer may comprise a first portion of amine groups that are quaternized or functionalized and a second portion of amine groups that are non-quaternized or non-functionalized. The total number of amine groups may be limited to avoid water solubility and discoloration, issues commonly occurring with amine-rich polymers such as polyethyleneimine.

Suitable reagents for forming quaternized amine groups may include epoxides and electrophiles, such as alkyl halides or alkyl sulfonates, for example. In some instances, suitable epoxides may be bifunctional compounds such as glycidyl methacrylate, allyl glycidyl ether, and similar compounds which may allow further crosslinking of the amine-functionalized copolymers to take place. Glycidyl methacrylate, for example, may lead to the deposited primer coating being curable by radiation. In addition, reagents for forming quaternized amine groups may afford improved substrate adhesion in certain circumstances.

The amine-functionalized copolymers of the present disclosure may have properties tailored for particular coating applications, wherein tailoring may be realized by varying the monomers and amounts thereof undergoing polymerization. Properties that may be varied include, for example, hydrophobicity/hydrophilcity, molecular weight, glass transition temperature and the like. Particularly desirable amine-functionalized copolymers of the present disclosure may have a glass transition temperature ranging from about 0° C. to about 50° C. Glass transition temperatures in this range may afford good film formation properties, in a non-limiting example. If the glass transition temperature is too low, excessive tackiness may result. Glass transition temperatures may be determined by differential scanning calorimetry (DSC) under the conditions specified above.

Depending on the polymerization conditions and other factors, the polymer molecular weights in the present disclosure may range from about $1 \times 10^4$ to about $1 \times 10^7$ or about $2 \times 10^4$ to about $1 \times 10^6$, or about $1 \times 10^5$ to about $1 \times 10^6$. Even higher molecular weights may be realized when crosslinking occurs. It is to be appreciated that polymer molecular weights outside the foregoing ranges also may be suitable for use in the disclosure herein. Polymer molecular weights in the present disclosure are weight average molecular weights (Mw) and may be determined by gel permeation chromatography (GPC) using refractive index (RI) detection. GPC analyses herein were performed by drying the polymer emulsion, redissolving the polymer in THF, and filtering through a 0.45 µm filter before injecting onto a Shimadzu LC-20AD GPC instrument containing 3 columns in series (STYRAGEL HR2, STYRAGEL HR4, and STYRAGEL HR6, Waters) and a refractive index detector (Waters 2410). Chromatograms were obtained at 35° C. at a THF flow rate of 1 mL/min, and molecular weights were calculated relative to polystyrene standards.

Substrates coated with a primer coating formed from the primer compositions of the present disclosure are also provided herein. Such coated substrates may comprise a base substrate, and a primer coating disposed upon a surface of the base substrate. The primer coating comprises an amine-functionalized copolymer having an amine number of about 10 to about 180 mg KOH/g copolymer, or about 70 to about 140 mg KOH/g copolymer, or about 30 to about 160 mg KOH/g copolymer, or about 50 to about 60 mg KOH/g copolymer, or about 60 to about 80 mg KOH/g copolymer, or about 80 to about 100 mg KOH/g copolymer, or about 100 to about 115 mg KOH/g copolymer, or about 115 to about 130 mg KOH/g copolymer, or about 130 to about 150 mg KOH/g copolymer, in which the amine-functionalized copolymer comprises a polymerized reaction product of one or more first ethylenically unsaturated monomers lacking an amine group and one or more second ethylenically unsaturated monomers bearing at least one amine group. The at least one amine group comprises a side chain of the amine-functionalized copolymer. Any of the amine-functionalized copolymers specified above may be used in forming the primer coatings and coated substrates described herein.

Once the primer compositions have been deposited upon the surface of a suitable substrate, the aqueous fluid may be removed to leave behind a primer coating comprising the amine-functionalized copolymer disposed in a suitable weight or thickness upon the surface. Any non-volatile components of the primer compositions may also remain within the primer coatings. Non-limiting examples of other components that may remain within the primer coatings following deposition include, for example, surfactants, starch, or any of the other additives listed above.

In non-limiting examples, the primer coating may be disposed upon a suitable base substrate by a process comprising depositing a coating composition of the present disclosure upon the base substrate, specifically a coating composition comprising the amine-functionalized copolymer dispersed as an emulsion within the aqueous fluid, and evaporating the aqueous fluid to leave the primer coating disposed upon the base substrate. Heating and/or application of vacuum may take place in some instances to promote removal of the aqueous fluid. Gas flow may also be used to facilitate removal of the aqueous fluid from the surface of a substrate in some instances.

Suitable base substrates that may be coated with the primer coatings disclosed herein are not believed to be particularly limited. Illustrative base substrates that may be suitably coated include, for example, polymeric substrates, non-woven substrates and paper substrates. Particular examples of suitable base substrates may include, but are not limited to, paper (e.g., art paper, coated paper, paper board, printer paper, cardboard, and the like), film (including polymeric films), non-woven materials, and the like. As used herein, the term "film" refers to a substrate made of an organic polymeric material, such as, for example, viscose, acetate, polyethylene, polypropylene, biaxially oriented polypropylene (BOPP) poly(vinyl chloride), polystyrene, polyamides, polycarbonates, or polyesters such as, poly (ethylene terephthalate) or poly(butylene terephthalate). As used herein, the term "non-woven" refers to a substrate which is made from a fiber material such as wood cellulose, cotton, rayon, poly(ethylene terephthalate), poly(butylene terephthalate), polyacrylonitrile, polypropylene or the like, in which individual fibers have been at least partially fused together.

As can be appreciated by one having ordinary skill in the art, BOPP and other polyolefin substrates are low surface energy materials, which makes them difficult to wet. Corona treatment of such substrates is often performed in order to introduce functional groups suitable for promoting primer coating adhesion. The primer coatings disclosed herein may exhibit good adhesion to such corona-treated substrates due to their balance between hydrophilic and lipophilic monomers.

When deposited upon the substrate surface, the primer coatings may have a coating weight ranging from about 0.05 g/m² to about 0.7 g/m², or from about 0.1 g/m² to about 0.6 g/m², or from about 0.1 g/m² to about 0.2 g/m², or from about 0.2 g/m² to about 0.3 g/m², or from about 0.3 g/m² to about 0.4 g/m², or from about 0.4 g/m² to about 0.5 g/m², or from about 0.5 g/m² to about 0.6 g/m², or from about 0.6 g/m² to about 0.7 g/m². When starch is present in the primer compositions, the primer coating may have even higher coating weights of up to 1.5 g/m². Accordingly, starch-containing coating weights may range from about 0.05 g/m² to about 1.5 g/m², or about 0.1 g/m² to about 0.5 g/m², or about 0.5 g/m² to about 0.9 g/m², or about 0.9 g/m² to about 1.2 g/m², or about 1.2 g/m² to about 1.5 g/m². Primer coatings lacking starch may also be present in these higher coating weights as well. Coating thicknesses of either type may range from about 0.1 microns to about 5 microns, or from about 0.3 microns to about 3 microns, or about 0.5 microns to about 2 microns.

Coated substrates of the present disclosure may further comprise a toner, such as HP INDIGO, deposited upon the primer coating, such as in the form of an electrophotographic image. Electrophotographic images that may be formed upon the primer coatings include, but are not limited to, text, illustrations, photographic images, and the like. Coated substrates comprising a toner may be formed by liquid electrophotographic printing, in non-limiting examples.

Methods for forming the primer compositions of the present disclosure are also contemplated herein. Suitable methods for forming the primer compositions may feature emulsion polymerization techniques in particular process configurations. The methods may comprise: combining one or more first ethylenically unsaturated monomers lacking an amine group with one or more second ethylenically unsaturated monomers bearing at least one amine group in an aqueous fluid, and forming an amine-functionalized copolymer having an amine number of about 10 to about 180 mg KOH/g copolymer, or about 70 to about 140 mg KOH/g copolymer, or about 30 to about 160 mg KOH/g copolymer, or about 50 to about 60 mg KOH/g copolymer, or about 60 to about 80 mg KOH/g copolymer, or about 80 to about 100 mg KOH/g copolymer, or about 100 to about 115 mg KOH/g copolymer, or about 115 to about 130 mg KOH/g copolymer, or about 130 to about 150 mg KOH/g copolymer in an emulsion polymerization reaction of the one or more first ethylenically unsaturated monomers and the one or more second ethylenically unsaturated monomers conducted in the aqueous fluid, thereby providing a coating composition comprising the amine-functionalized copolymer dispersed as an emulsion in the aqueous fluid. Anionic or non-ionic surfactants may be used in the aqueous fluid, with non-ionic surfactants extending the range of potential substrates upon which the primer compositions may be used, after blending with either anionic or cationic additives.

Radical initiators that may be used in the emulsion polymerization include, for example, alkali persulfates, ammonium persulfate, azo initiators such as 4,4'-azobis-cyanovaleric acid or AIBN, and organic (hydro)peroxides, such as t-butyl hydroperoxide. Azo initiators may be particularly desirable due to their ability to initiate polymerization without participating in oxidation-reduction reactions with the amine-containing monomers. The radicals can be formed by heating the reaction mixture, or by using a reducing agent such as ascorbic acid or sodium formaldehyde sulfoxylate, among others. The polymerization reaction may occur at a temperature ranging from about 20° C. to about 90° C. Organic chain transfer agents, also known as regulators, such as 2-mercaptoethanol, tert-dodecyl mercaptan, among others, can also be implemented to control the molecular weight of the copolymer during its preparation.

Deposition of the primer composition upon a base substrate may be realized by applying the primer composition to at least one surface of the base substrate and drying to remove the aqueous fluid. Application of the primer composition to the base substrate may be achieved using any of a variety of methods such as, for example, immersion, spraying, rod or roller, or using equipment such as a size press, water box, blade coater, cast coater, rod coater, air knife coater, curtain coater, film press coater, flexo coater, or the like. The primer composition may be applied inline during a printing process or offline, with the coated substrate being supplied subsequently to the printing process in offline configurations.

Embodiments disclosed herein include:

A. Primer compositions having an amine number of about 70 to about 140 mg KOH/g. The primer compositions comprise: an emulsion-polymerized amine-functionalized copolymer dispersed as an emulsion in an aqueous fluid, the amine-functionalized copolymer having an amine number of about 70 to about 140 mg KOH/g copolymer and a glass transition temperature of about 0° C. to about 50° C.; wherein the amine-functionalized copolymer comprises a polymerized reaction product of: one or more first ethylenically unsaturated monomers lacking an amine group; and one or more second ethylenically unsaturated monomers bearing at least one amine group, the at least one amine group comprising a side chain of the amine-functionalized copolymer.

B. Primer compositions having an amine number of about 10 to about 180 mg KOH/g. The primer compositions comprise: a fluid; and an amine-functionalized copolymer dispersed in the fluid, the amine-functionalized copolymer having an amine number of about 10 to about 180 mg KOH/g copolymer; wherein the amine-functionalized copolymer comprises a polymerized reaction product of: one or more first ethylenically unsaturated monomers lacking an amine group; and one or more second ethylenically unsaturated monomers bearing at least one amine group, the at least one amine group comprising a side chain of the amine-functionalized copolymer.

C. Coated substrates. The coated substrates comprise: a base substrate; and a primer coating disposed upon a surface of the base substrate; wherein the primer coating comprises an amine-functionalized copolymer having an amine number of about 10 to about 180 mg KOH/g copolymer; wherein the amine-functionalized copolymer comprises a polymerized reaction product of: one or more first ethylenically unsaturated monomers lacking an amine group; and one or more second ethylenically unsaturated monomers bearing at least one amine group, the at least one amine group comprising a side chain of the amine-functionalized copolymer.

D. Methods for making a primer composition. The methods comprise: combining one or more first ethylenically unsaturated monomers lacking an amine group with one or more second ethylenically unsaturated monomers bearing at least one amine group in an aqueous fluid; and forming an amine-functionalized copolymer having an amine number of about 10 to about 180 mg KOH/g copolymer in an emulsion polymerization reaction of the one or more first ethylenically unsaturated monomers and the one or more second ethylenically unsaturated monomers conducted in the aqueous fluid, thereby providing a coating composition comprising the amine-functionalized copolymer dispersed as an emulsion in the aqueous fluid.

Each of embodiments A-D may have one or more of the following additional elements in any combination:

Element 1: wherein the aqueous fluid has a pH of about 7 or greater.

Element 2: wherein the primer composition further comprises a neutral surfactant or an anionic surfactant dispersed in the aqueous fluid.

Element 3: wherein the primer composition further comprises: a starch dispersed in the aqueous fluid.

Element 4: wherein the primer composition further comprises: an adhesion promoter differing from the amine-functionalized copolymer dispersed in the aqueous fluid.

Element 5: wherein the primer composition further comprises: an adhesion promoter differing from the amine-functionalized copolymer dispersed in the fluid.

Element 6: wherein the amine-functionalized copolymer further comprises at least one monomer unit bearing a side chain carboxylic acid.

Element 7: wherein the amine number ranges from about 70 to about 140 mg KOH/g copolymer.

Element 8: wherein the amine-functionalized copolymer is dispersed as an emulsion in the fluid.

Element 9: wherein the primer composition further comprises: a neutral surfactant or an anionic surfactant dispersed in the fluid.

Element 10: wherein the one or more first ethylenically unsaturated monomers comprise at least one monomer selected from the group consisting of an alkyl or cycloalkyl (meth)acrylate, n-butyl (meth)acrylate, methyl (meth)acrylate, ethyl (meth)acrylate, 2-ethylhexyl (meth)acrylate, isobornyl (meth)acrylate, cyclohexyl (meth)acrylate, styrene, a substituted styrene, a diene, 1,3-butadiene, isoprene, a vinyl ester, vinyl acetate, a nitrile, (meth)acrylonitrile, an olefinically unsaturated halide, vinyl chloride, vinyl bromide, hydroxyethyl (meth)acrylate, hydroxylpropyl (meth)acrylate; (meth)acrylamide, a substituted (meth)acrylamide, N-methylol (meth)acrylamide, diacetone acrylamide, allyl methacrylate, divinyl benzene, alkylene glycol di(meth)acrylates, and any combination thereof.

Element 11: wherein the one or more second ethylenically unsaturated monomers comprise at least one monomer selected from the group consisting of 2-(dimethylamino) ethyl methacrylate, 2-(diethylamino)ethyl methacrylate, 2-(tert-butylamino)ethyl methacrylate, and any combination thereof.

Element 12: wherein the amine-functionalized copolymer comprises a first portion of amine groups that are protonated and a second portion of amine groups that are unprotonated.

Element 13: wherein the primer composition further comprises: a starch dispersed in the fluid.

Element 14: wherein the amine-functionalized copolymer has a glass transition temperature of about 0° C. to about 50° C.

Element 15: wherein the fluid comprises an aqueous fluid.

Element 16: wherein the base substrate comprises a polymeric substrate.

Element 17: wherein the base substrate comprises a paper substrate.

Element 18: wherein the primer coating further comprises a starch.

Element 19: wherein the primer coating has a coating weight ranging from about 0.05 g/m² to about 1.5 g/m².

Element 20: wherein the primer coating further comprises a neutral surfactant or an anionic surfactant.

Element 21: wherein the coated substrate further comprises: a toner deposited upon the primer coating.

Element 22: wherein the primer coating is disposed upon the base substrate by a process comprising: depositing a coating composition upon the base substrate, the coating composition comprising the amine-functionalized copolymer dispersed as an emulsion in the aqueous fluid; and evaporating the aqueous fluid to leave the primer coating disposed upon the base substrate.

Element 23: wherein the method further comprises: disposing the coating composition upon a base substrate; and evaporating the aqueous fluid to leave the amine-functionalized copolymer disposed as a primer coating upon the base substrate.

Element 24: wherein the amine-functionalized copolymer comprises about 1 wt. % to about 60 wt. % of the one or more second olefinically unsaturated monomers bearing at least one amine group, optionally about 5 wt. % to about 45 wt. %, or about 10 wt. % to about 40 wt. %, or about 10 wt. % to about 25 wt. %, or about 25 wt. % to about 40 wt. %.

Element 25: wherein the amine-functionalized copolymer comprises about 60 wt. % to about 100% acrylate monomers, and about 40 wt. % or less ethylenically unsaturated monomers that are not an acrylate or methacrylate monomer, optionally wherein the amine-functionalized copolymer comprises all acrylate or methacrylate monomers.

Element 26: wherein the amine-functionalized copolymer comprises about 10 wt. % or less of an acid-containing monomer, optionally about 0.1 wt. % to about 10 wt. % of an acid-containing monomer, further optionally wherein the acid-containing monomer is an acrylic acid, methacrylic acid, or any derivative thereof.

By way of non-limiting example, exemplary combinations applicable to A include, but are not limited to, 1 and 2; 1 and 3; 1 and 4; 2 and 3; 2 and 4; 3 and 4; 1-3; 1-4; 2-4; 1 and 24; 1 and 25; 1 and 26; 2 and 24; 2 and 25; 2 and 26; 3 and 24; 3 and 25; 3 and 26; 1-3, and 24; 1-3, and 25; 1-3, and 26; 1-4, and 24; 1-4, and 25; 1-4, and 26; 24 and 25; 24 and 26; 25 and 26; and 24-26. By way of further non-limiting example, exemplary combinations applicable to B include, but are not limited to, 5 and 6; 5 and 7; 5 and 8; 5 and 9; 5 and 10; 5 and 11; 5 and 12; 5 and 13; 5 and 14; 5 and 15; 6 and 7; 6 and 8; 6 and 9; 6 and 10; 6 and 11; 6 and 12; 6 and 13; 6 and 14; 6 and 15; 7 and 8; 7 and 9; 7 and 10; 7 and 11; 7 and 12; 7 and 13; 7 and 14; 7 and 15; 8 and 9; 8 and 10; 8 and 11; 8 and 12; 8 and 13; 8 and 14; 8 and 15; 9 and 10; 9 and 11; 9 and 12; 9 and 13; 9 and 14; 9 and 15; 10 and 11; 10 and 12; 10 and 13; 10 and 14; 10 and 15; 11 and 12; 11 and 13; 11 and 14; 11 and 15; 12 and 13; 12 and 14; 12 and 15; 13 and 14; 13 and 15; 14 and 15, any of which may be in further combination with 24, 25, and/or 26; 5 and 24; 5 and 25; 5 and 26; 6 and 24; 6 and 25; 6 and 26; 7 and 24; 7 and 25; 7 and 26; 8 and 24; 8 and 25; 8 and 26; 9 and 24; 9 and 25; 9 and 26; 10 and 24; 10 and 25; 10 and 26; 11 and 24; 11 and 25; 11 and 26; 12 and 24; 12 and 25; 12 and 26; 13 and 24; 13 and 25; 13 and 26; 14 and 24; 14 and 25; 14 and 26; 15 and 24; 15 and 25; 15 and 26; 24 and 25; 24 and 26; 25 and 26; and 24-26. Further non-limiting exemplary combinations applicable to C include, but are not limited to, 16 and 19; 16 and 20; 16 and 21; 16 and 22; 14 and 16; 17 and 18; 17-19; 17 and 19; 17 and 20; 17 and 21; 17 and 22; 14 and 17; 18 and 19; 18 and 20; 18 and 21; 18 and 22; 14 and 18; 19 and 20; 19 and 21; 19 and 22; 14 and 19; 20 and 21; 20 and 22; 14 and 20; 21 and 22; 14 and 21; 14 and 22, any of which may be in further combination with 24, 24, and/or 26; 14 and 24; 14 and 25; 14 and 26; 16 and 24; 16 and 25; 16 and 26; 17 and 24; 17 and 25; 17 and 26; 18 and 24; 18 and 25; 18 and 26; 19 and 24; 19 and 25; 19 and 26; 20 and 24; 20 and 25; 20 and 26; 21 and 24; 21 and 25; 21 and 26; 24 and 25; 24 and 26; 25 and 26; and 24-26. Further non-limiting exemplary combinations applicable to D include, but are not limited to, 6 and 23; 7 and 23; 9 and 23; 10 and 23; 11 and 23; 12 and 23; 14 and 23; 6 and 7; 6 and 9; 6 and 10; 6 and 11; 6 and 12; 6 and 14; 7 and 9; 7 and 10; 7 and 11; 7 and 12; 7 and 14; 9 and 10; 9 and 11; 9 and 12; 9 and 14; 10 and 11; 10 and 12; 10 and 14; 11 and 12; 11 and 14; and 12 and 14, any of which may be in further combination with 24, 24, and/or 26; 6 and 24; 6 and 25; 6 and 26; 7 and 24; 7 and 25; 7 and 26; 9 and 24; 9 and 25; 9 and 26; 10 and 24; 10 and 25; 10 and 26; 11 and 24; 11 and 25; 11 and 26; 12 and 24; 12 and 25; 12 and 26; 14 and 24; 14 and 25; 14 and 26; 24 and 25; 24 and 26; 25 and 26; and 24-26.

To facilitate a better understanding of the disclosure herein, the following examples of various representative embodiments are given. In no way should the following examples be read to limit, or to define, the scope of the present disclosure.

EXAMPLES

Example 1: Illustrative Polymer Synthesis and Emulsion Formulation Procedure. One kilogram of product was prepared by emulsion polymerization of a monomer mixture. The emulsion polymerization was carried out in a temperature-regulated double-walled glass reactor fitted with an overhead condenser, a stirrer and a nitrogen inlet (20 mL/min $N_2$ flow). A 7 mM solution of DOWFAX 2A1 (Dow Chemical) emulsifying agent in 211 g demineralized water was added to the reactor and heated to 85° C. In a separate vessel, a monomer mixture comprising 228 g n-butyl acrylate, 146 g styrene and 94 g 2-(dimethylamino)ethyl methacrylate was emulsified in 247 g water in the presence of 14 g of DISPONIL A 3065 (BASF) emulsifying agent. 5 g of an aqueous solution of 10 wt. % 4,4'-Azobis(4-cyanovaleric acid) neutralized 1.5 times with ammonia was added to the reactor, followed 5 minutes afterward by 25 g of the monomer emulsion prepared previously. The reaction mixture was allowed to polymerize for 20 minutes, after which time the remaining monomer emulsion was fed to the reaction mixture at a constant rate over a period of 4 hours. During this period, a parallel constant rate feed of 24 g of an aqueous solution of 4 wt. % 4,4'-Azobis(4-cyanovaleric acid) neutralized 1.5 times with ammonia was also added to the reaction mixture. After addition of both feeds was complete, the reactor contents were maintained under stirring conditions at 85° C. for an additional 60 minutes. High monomer conversions exceeding 80% were obtained under the polymerization conditions.

The resulting polymer dispersion was cooled to 50° C., and 14 g of an aqueous solution of 4 wt. % t-butyl hydroperoxide and 14 g of an aqueous solution of 6 wt. % BRUGGOLITE® FF6M reducing agent (Bruggemann GmbH & Co), 0.2 wt. % iron(II) sulfate heptahydrate and 0.5 wt. % tetrasodium ethylenediaminetetraacetic acid were fed to the reactor in parallel over a period of 2 hours. Thereafter, the reaction mixture was maintained at 50° C. for 30 minutes and then cooled to room temperature. Upon reaching room temperature, 0.05 g of BYK-016 (BYK-Chemie) defoamer was added slowly to the reaction mixture under high rate stirring. The resulting emulsion was used directly for coating applications without further modification, unless further modified as specified below.

Other polymer emulsions in the examples below were prepared similarly by substituting a specified ratio of ethylenically unsaturated monomers in the monomer mixture.

Example 2: Coating on Polymeric Substrates and Adhesion Testing. Polymer emulsions prepared as in Example 1 were coated onto a 48 ga PET polyester substrate such that the layer weight was 0.5 g/m² after drying at 105° C. for one minute. For the data in Table 1 below, a hot-nip laminator was used to transfer HP color blocks from an untreated BOPP substrate to a PET substrate primed as above. In this case, hand drawdowns were performed with Meyer rods to deliver the primer composition onto the substrate surface, and hot-nip lamination followed thereafter. For the data in Table 2 below, the primer coatings were applied using a HP INDIGO 6000 press, and printing was conducted with the press instrument using HP INDIGO ELECTROINK under standard printing conditions. In particular, printing was performed using the HP INDIGO 6000 press operating in 4 shot mode with a drying temperature of 80° C. and a corona power intensity of 800 W on the priming unit.

Ink adhesion to the primer coating was evaluated by applying SCOTCH® 810 (3M) tape to the printed surface immediately after printing and removing the tape after 15 minutes. The testing procedure was similar to that described in ASTM 2252/2252M, except for using SCOTCH® 810 tape instead of SCOTCH® 610 tape and performing 4 passes of a 2 kg roller to press the tape onto the coated substrate. The percentage removal of the printed image was evaluated visually.

Adhesion testing results and selected physical property data is summarized in Tables 1 and 2 below. A value of "none" or 0% indicates that the printed image was fully removed, and a value of 100% indicates that no image removal was apparent. Control data for polymers bearing non-amine functional groups and deposited under similar conditions is shown in Table 1. Data for polymers bearing various amounts of amine functional groups is shown in Table 2. Monomer percentages are by weight of the individual monomers with respect to the total weight of monomers. Glass transition temperatures (TO were determined via differential scanning calorimetry using a DSC 3+ instrument (Mettler Toledo). The scanning cycle consisted of an initial cooling to −60° C. at a 20° C./min ramp, followed by a stabilizing period of 5 minutes at this temperature. The sample was then heated at a ramp of 20° C./min up to a temperature of 120° C./min, followed by a second stabilizing period of 5 minutes at this temperature. Two of the foregoing cycles were performed for each sample, with the first cycle removing the thermal history of the sample and the second cycle being used to determine the $T_g$ value.

TABLE 1

| Entry | Functionality | Monomer Mixture | Print Adhesion |
|---|---|---|---|
| 1 | carboxyl | 70% n-butyl acrylate<br>11% styrene<br>15% methacrylic acid<br>4% acrylic acid | None (0%) |
| 2 | carboxyl | 44% 2-ethyhexylacrylate<br>39% styrene<br>17% acrylic acid | None (0%) |
| 3 | carboxyl | 69% n-butylacrylate<br>11% styrene<br>20% methacrylic acid | None (0%) |
| 4 | carboxyl | 39% n-butylacrylate<br>11% styrene<br>50% methacrylic acid | None (0%) |
| 5 | epoxide | 74% n-butylacrylate<br>11% styrene<br>15% glycidyl methacrylate | None (0%) |

TABLE 1-continued

| Entry | Functionality | Monomer Mixture | Print Adhesion |
|---|---|---|---|
| 6 | epoxide | 59% n-butyl acrylate<br>11% styrene<br>30% glycidyl methacrylate | None (0%) |
| 7 | epoxide | 53% n-butyl acrylate<br>32% styrene<br>15% methacrylic acid | None (0%) |
| 8 | epoxide | 56% n-butylacrylate<br>26% methyl methacrylate<br>18% glycidyl methacrylate | None (0%) |
| 9 | hydroxyl | 55% n-butylacrylate<br>25% methyl methacrylate<br>20% 2-hydroxyethyl methacrylate | None (0%) |
| 10 | amide | 40% 2-ethylhexyl acrylate<br>47% styrene<br>3% methacrylic acid<br>10% acrylamide | 10% |
| 11 | amide | 38% 2-ethylhexyl acrylate<br>44% styrene<br>3% methacrylic acid<br>15% acrylamide | 20% |
| 12 | urea | 65% n-butyl acrylate<br>25% methyl methacrylate<br>10% ureido methacrylate | 20% |

TABLE 2

| Entry | % Amine Monomer | Monomer Mixture | $T_g$ (°C.) | Print Adhesion |
|---|---|---|---|---|
| 13 | 0% | 53% n-butyl acrylate<br>47% methyl methacrylate | 10 | 0% |
| 14 | 15% | 15% (dimethylamino)ethyl methacrylate<br>45% n-butyl acrylate<br>40% styrene | 0 | 60% |
| 15 | 20% | 20% (dimethylamino)ethyl methacrylate<br>54% n-butyl acrylate<br>26% styrene | −8 | 90% |
| 16 | 20% | 20% (dimethylamino)ethyl methacrylate<br>36% 2-ethyhexyl acrylate<br>44% styrene | 3 | 40% |
| 17 | 20% | 20% (dimethylamino)ethyl methacrylate<br>49% n-butyl acrylate<br>31% styrene | 1 | 90% |
| 18 | 20% | 20% (dimethylamino)ethyl methacrylate<br>43% n-butyl acrylate<br>37% methyl methacrylate | 6 | 90% |
| 19 | 20% | 20% (dimethylamino)ethyl methacrylate<br>10% n-butyl methacrylate<br>15% methyl methacrylate<br>55% n-butyl methacrylate | 23 | 90% |
| 20 | 20% | 20% (dimethylamino)ethyl methacrylate<br>25% n-butyl methacrylate<br>10% methyl methacrylate<br>45% n-butyl methacrylate | 2 | 90% |
| 21 | 20% | 20% (dimethylamino)ethyl methacrylate<br>51% n-butyl methacrylate<br>29% styrene | −3 | 90% |
| 22 | 30% | 30% (dimethylamino)ethyl methacrylate<br>37% n-butyl acrylate<br>33% styrene | 9 | 90% |
| 23 | 30% | 30% (dimethylamino)ethyl methacrylate<br>43% n-butyl acrylate<br>27% styrene | 0 | 90% |
| 24 | 30% | 30% (dimethylamino)ethyl methacrylate<br>18% n-butyl acrylate<br>10% methyl methacrylate<br>42% n-butyl methacrylate | 9 | 90% |
| 25 | 30% | 30% (dimethylamino)ethyl methacrylate<br>43% n-butyl acrylate<br>27% styrene | −3 | 90% |
| 26 | 30% | 30% (dimethylamino)ethyl methacrylate<br>42% n-butyl acrylate<br>27% styrene<br>1% divinyl benzene | 3 | 80% |
| 27 | 40% | 40% (dimethylamino)ethyl methacrylate<br>39% n-butyl acrylate<br>21% methyl methacrylate | −9 | 90% |
| 28 | 40% | 40% (dimethylamino)ethyl methacrylate<br>34% n-butyl acrylate<br>26% methyl methacrylate | −1 | 90% |
| 29 | 40% | 40% (dimethylamino)ethyl methacrylate<br>39% 2-ethylhexyl acrylate<br>26% methyl methacrylate | −11 | 40% |
| 30 | 40% | 40% (dimethylamino)ethyl methacrylate<br>34% n-butyl acrylate<br>24% methyl methacrylate<br>2% n-methylol acrylamide | −1 | 80% |
| 31 | 40% | 40% (dimethylamino)ethyl methacrylate<br>18% n-butyl acrylate<br>10% methyl methacrylate<br>32% n-butyl methacrylate | 2 | 80% |
| 32 | 40% | 40% (dimethylamino)ethyl methacrylate<br>39% n-butyl acrylate<br>21% styrene | −2 | 80% |
| 33 | 40% | 18% (dimethylamino)ethyl methacrylate<br>22% 2-(t-butylamino)ethyl methacrylate<br>20% n-butyl acrylate<br>10% methyl methacrylate<br>30% n-butyl methacrylate | 10 | 90% |
| 34 | 41% | 19% (dimethylamino)ethyl methacrylate<br>22% 2-(t-butylamino)ethyl methacrylate<br>34% n-butyl acrylate<br>25% methyl methacrylate | 10 | 90% |
| 35 | 15% | 15% (dimethylamino)ethyl methacrylate<br>4% methacrylic acid<br>54% n-butyl acrylate<br>27% styrene | 9 | 60% |
| 36 | 15% | 15% (dimethylamino)ethyl methacrylate<br>8% methacrylic acid<br>51% n-butyl acrylate<br>26% styrene | 15 | 0% |
| 37 | 20% [after HCl neutralization] | 20% (dimethylamino)ethyl methacrylate<br>54% n-butyl acrylate<br>26% styrene | −8 | 0% |
| 38 | 30% [after 0.5 eq. glycidyl methacrylate] | 30% (dimethylamino)ethyl methacrylate<br>37% n-butyl acrylate<br>33% styrene | 9 | 80% |

As shown in Table 1, coatings formulated with various copolymers containing carboxyl, epoxide, or hydroxyl functionalities afforded ink transfer after lamination but did not promote image adhesion as measured by the tape pull test.

Copolymers containing amide or urea functionalities afforded a limited amount of image adhesion as measured by the tape pull test, possibly due to the formation of N—H hydrogen bonds or partial acid-base interactions between these functional groups and the carboxyl functionalities in the toner.

As shown in Table 2, multiple amine-containing copolymers afforded both good image transfer and strong adhesion as measured by the tape pull test. In most cases, the percent adhesion exceeded 80%. A copolymer having a similar composition to those exhibiting strong adhesion but lacking an amine-containing monomer (Entry 13) did not demonstrate measurable adhesion by the tape pull test. Copolymers having two different types of amine-containing monomers (Entries 33 and 34) exhibited similar percent adhesion values to those having only a single type of amine-containing monomer.

Primer coatings featuring copolymers containing monomers capable of internally protonating the amine groups or copolymers having the amine groups fully or partially quaternized or protonated following polymerization exhibited a lower percent adhesion once a threshold level of amine modification was reached. Incorporation of carboxylic acid groups above a threshold level completely blocked image adhesion (Entry 36), whereas significant image adhesion still was realized when a lower amount of carboxylic acid functionalities were present (Entry 35). The adhesion observed for the copolymer of Entry 35 was similar to or only modestly lower than that observed for copolymers having similar quantities of the other monomers but lacking the carboxylic acid-containing monomer (Entries 15 and 17). Like incorporation of excessive carboxylic acid functionalities, post-synthesis acidification with a mineral acid completely disrupted the ability of the copolymer to promote image adhesion (Entry 37), whereas the non-acidified copolymer showed very good image adhesion (Entry 15). Partial epoxide functionalization of the amine groups maintained good image adhesion (Entry 38), with only a minimal decrease observed compared to the non-functionalized counterpart copolymer (Entry 22).

Example 3: Additional Adhesion Testing Data for Coatings on Plastic Substrates. Polymer emulsions prepared as in Example 1 were coated onto a 48 ga PET polyester substrate or an 80 ga BOPP (biaxially orientated polypropylene) substrate. Coating was performed as in Example 2 using a HP INDIGO 6000 press. The coating weight was varied in this example as well. Adhesion testing results and selected physical property data is summarized in Table 3 below.

TABLE 3

| Entry | Substrate | Monomer Mixture | Coating Weight (g/m$^2$) | Print Adhesion |
|---|---|---|---|---|
| 39 | 48 ga PET | 34% n-butyl acrylate<br>26% methyl methacrylate<br>40% 2-(dimethylamino)ethyl methacrylate | 0.12 | 50% |
| 40 | 48 ga PET | 34% n-butyl acrylate<br>26% methyl methacrylate<br>40% 2-(dimethylamino)ethyl methacrylate | 0.21 | 85% |
| 41 | 48 ga PET | 34% n-butyl acrylate<br>26% methyl methacrylate<br>40% 2-(dimethylamino)ethyl methacrylate | 0.29 | 95% |
| 42 | 80 ga BOPP | 34% n-butyl acrylate<br>26% methyl methacrylate<br>40% 2-(dimethylamino)ethyl methacrylate | 0.21 | None (0%) |
| 43 | 48 ga PET | 18% n-butyl acrylate<br>10% methyl methacrylate<br>34% n-butyl methacrylate<br>38% 2-(dimethylamino)ethyl methacrylate | 0.20 | 95% |
| 44 | 48 ga PET | 25% n-butyl acrylate<br>10% methyl methacrylate<br>45% n-butyl methacrylate<br>20% 2-(dimethylamino)ethyl methacrylate | 0.17 | 95% |
| 45 | 48 ga PET | 51% n-butyl acrylate<br>29% styrene<br>20% 2-(dimethylamino)ethyl methacrylate | 0.16 | 80% |
| 46 | 48 ga PET | 34% n-butyl acrylate<br>26% methyl methacrylate<br>40% 2-(dimethylamino)ethyl methacrylate +<br>10% LUPASOL P | 0.25 | 80% |
| 47 | 80 ga BOPP | 34% n-butyl acrylate<br>26% methyl methacrylate<br>40% 2-(dimethylamino)ethyl methacrylate +<br>10% LUPASOL P | 0.27 | 90% |
| 48 | 48 ga PET | 18% n-butyl acrylate<br>10% methyl methacrylate<br>34% n-butyl methacrylate<br>38% 2-(dimethylamino)ethyl methacrylate +<br>10% LUPASOL P | 0.25 | 80% |
| 49 | 80 ga BOPP | 18% n-butyl acrylate<br>10% methyl methacrylate<br>34% n-butyl methacrylate<br>38% 2-(dimethylamino)ethyl methacrylate +<br>10% LUPASOL P | 0.27 | 90% |
| 50 | 48 ga PET | 25% n-butyl acrylate<br>10% methyl methacrylate<br>45% n-butyl methacrylate<br>20% 2-(dimethylamino)ethyl methacrylate +<br>20% NEOREZ R605 | 0.19 | 80% |
| 51 | 80 ga BOPP | 25% n-butyl acrylate<br>10% methyl methacrylate<br>45% n-butyl methacrylate<br>20% 2-(dimethylamino)ethyl methacrylate +<br>20% NEOREZ R605 | 0.21 | 85% |
| 52 | 48 ga PET | 51% n-butyl acrylate<br>29% styrene<br>20% 2-(dimethylamino)ethyl methacrylate +<br>20% NEOREZ R605 | 0.18 | 80% |
| 53 | 80 ga BOPP | 51% n-butyl acrylate<br>29% styrene<br>20% 2-(dimethylamino)ethyl methacrylate +<br>20% NEOREZ R605 | 0.18 | 90% |

LUPASOL P = polyethyleneimine (BASF)
NEOREZ R605 = polyurethane (DSM Coating Resins, Inc.)

As shown, incorporation of polyethyleneimine or polyurethane as a further adhesion promoter into the coatings did not significantly impact the observed image adhesion (Entries 46-53). Polyethyleneimine or polyurethane were added to promote adhesion to the BOPP substrate.

Water resistance of the coatings from Entries 44 and 46 was tested by submerging the coated PET substrate over a period of 30 minutes, 1 hour, 3 hours and 24 hours. A tape pull test was performed each time after the coated substrate was removed from the water. The relatively hydrophilic copolymer coating (Entry 46) exhibited considerable delamination after just 30 minutes of water immersion, whereas the more hydrophobic copolymer (Entry 44) did not experience significant delamination over the test period.

Example 4: Adhesion Testing Data for Coatings on Paper Substrates. 8 wt. % aqueous starch solutions were prepared by keeping the solution at 90° C. for a period of at least 25 minutes, after which the solution's pH was adjusted to 8.5 using 1 wt. % potassium hydroxide solution. Each starch solution was blended with a polymer emulsion prepared as in Example 1 at a blend ratio of 75% starch and 25% copolymer, based on solids. The blends were kept at 60° C. for 1 hour before application upon a sheet of commercially available Starbrite Opaque Select Smooth 100T paper (Verity, Caliper 7.4, Brightness 96 and Opacity 97) having a base weight of approximately 150 g/m$^2$. Coating was performed using a Meyer rod #4 and targeting a coating weight of 2 g/m$^2$ of dry material. Brookfield viscosity was determined immediately after formulation and after 24 hours of storage at 60° C. to determine the colloidal stability of the blended coating emulsion. All of the amine-containing copolymers were colloidally stable with the starches tested. That is, the viscosity did not change appreciably over the 24-hour observation period.

The coated paper sheets were prepared using an HP Indigo press WS 5500 Series 3 operating in 4 shot mode, following a standard screening procedure, with blanket and impression drum temperatures of 110° C. and 42° C., respectively. HP 100% black liquid toner and HP 290% Photo black toner (52% yellow, 66% magenta, 72% cyan and 100% black) were printed on the coated paper sheets. Ink adhesion was evaluated by performing tape pull tests with SCOTCH® 234 (3M) tape after 10 minutes. Percent adhesion was evaluated using a flatbed scanner and processing the scanned image to determine the area removed by the tape. HP ELECTROINK adhesion to the uncoated paper was found to be 65% for the 100% black toner and 39% for the 290% Photo black toner. Tables 4-7 show adhesion results obtained for blends of the amine-containing copolymer emulsions with hydroxyethylated corn starch (INGREDION PEN-COTE®), oxidized corn starch (Douglas 3040), hydroxyethylated tapioca starch (EXCELSIZE 22), and hydroxyethylated potato starch (WESCOTE 3070), respectively. The amine-containing copolymers were colloidally stable with the starches tested, and the viscosity did not change appreciably over the observation period.

TABLE 4

| Entry | Monomer Mixture Combined with Hydroxyethylated Corn Starch (1:3) | Viscosity (Cp) Initial | Viscosity (Cp) Final | Print Adhesion 100% Black | Print Adhesion 290% Black |
|---|---|---|---|---|---|
| 54 | 53% n-butyl acrylate 47% methyl methacrylate | 47 | 140 | 68% | 42% |
| 55 | 51% n-butyl acrylate 29% styrene 20% 2-(dimethylamino)ethyl methacrylate | 37 | 150 | 100% | 100% |
| 56 | 43% n-butyl acrylate 37% methyl methacrylate 20% 2-(dimethylamino)ethyl methacrylate | 37 | 150 | 100% | 100% |
| 57 | 25% n-butyl acrylate 10% methyl methacrylate 45% n-butyl methacrylate 20% 2-(dimethylamino)ethyl methacrylate | 26 | 89 | 98% | 98% |
| 58 | 33% n-butyl acrylate 25% methyl methacrylate 22% 2-(t-butylamino)ethyl methacrylate 20% 2-(dimethylamino)ethyl methacrylate | 36 | 151 | 100% | 100% |
| 59 | 34% n-butyl acrylate 26% methyl methacrylate 40% 2-(dimethylamino)ethyl methacrylate | 29 | 158 | 99% | 99% |

TABLE 5

| Entry | Monomer Mixture Combined with Oxidized Corn Starch (1:3) | Viscosity (Cp) Initial | Viscosity (Cp) Final | Print Adhesion (%) 100% Black | Print Adhesion (%) 290% Black |
|---|---|---|---|---|---|
| 60 | 53% n-butyl acrylate 47% methyl methacrylate | 100 | 156 | 66% | 33% |
| 61 | 51% n-butyl acrylate 29% styrene 20% 2-(dimethylamino)ethyl methacrylate | 62 | 122 | 99% | 97% |
| 62 | 43% n-butyl acrylate 37% methyl methacrylate 20% 2-(dimethylamino)ethyl methacrylate | 82 | 200 | 88% | 70% |
| 63 | 25% n-butyl acrylate 10% methyl methacrylate 45% n-butyl methacrylate 20% 2-(dimethylamino)ethyl methacrylate | 14 | 14 | 98% | 100% |
| 64 | 33% n-butyl acrylate 25% methyl methacrylate 22% 2-(t-butylamino)ethyl methacrylate 20% 2-(dimethylamino)ethyl methacrylate | 118 | 106 | 100% | 100% |
| 65 | 34% n-butyl acrylate 26% methyl methacrylate 40% 2-(dimethylamino)ethyl methacrylate | 138 | 150 | 99% | 99% |

TABLE 6

| Entry | Monomer Mixture Combined with Hydroxyethylated Tapioca Starch (1:3) | Viscosity (Cp) Initial | Viscosity (Cp) Final | Print Adhesion (%) 100% Black | Print Adhesion (%) 290% Black |
|---|---|---|---|---|---|
| 66 | 53% n-butyl acrylate 47% methyl methacrylate | 4 | 2 | 63% | 37% |
| 67 | 51% n-butyl acrylate 29% styrene 20% 2-(dimethylamino)ethyl methacrylate | 2 | 2 | 98% | 95% |
| 68 | 43% n-butyl acrylate 37% methyl methacrylate 20% 2-(dimethylamino)ethyl methacrylate | 4 | 4 | 98% | 98% |

TABLE 6-continued

| Entry | Monomer Mixture Combined with Hydroxyethylated Tapioca Starch (1:3) | Viscosity (Cp) Initial | Viscosity (Cp) Final | Print Adhesion (%) 100% Black | Print Adhesion (%) 290% Black |
|---|---|---|---|---|---|
| 69 | 25% n-butyl acrylate<br>10% methyl methacrylate<br>45% n-butyl methacrylate<br>20% 2-(dimethylamino)ethyl methacrylate | 4 | 2 | 98% | 95% |
| 70 | 33% n-butyl acrylate<br>25% methyl methacrylate<br>22% 2-(t-butylamino)ethyl methacrylate<br>20% 2-(dimethylamino)ethyl methacrylate | 6 | 6 | 99% | 99% |
| 71 | 34% n-butyl acrylate<br>26% methyl methacrylate<br>40% 2-(dimethylamino)ethyl methacrylate | 4 | 4 | 92% | 86% |

TABLE 7

| Entry | Monomer Mixture Combined with Hydroxyethylated Potato Starch (1:3) | Viscosity (Cp) Initial | Viscosity (Cp) Final | Print Adhesion (%) 100% Black | Print Adhesion (%) 290% Black |
|---|---|---|---|---|---|
| 72 | 53% n-butyl acrylate<br>47% methyl methacrylate | 18 | 14 | 68% | 32% |
| 73 | 51% n-butyl acrylate<br>29% styrene<br>20% 2-(dimethylamino)ethyl methacrylate | 14 | 12 | 99% | 98% |
| 74 | 43% n-butyl acrylate<br>37% methyl methacrylate<br>20% 2-(dimethylamino)ethyl methacrylate | 14 | 14 | 98% | 98% |
| 75 | 25% n-butyl acrylate<br>10% methyl methacrylate<br>45% n-butyl methacrylate<br>20% 2-(dimethylamino)ethyl methacrylate | 20 | 14 | 100% | 100% |
| 76 | 33% n-butyl acrylate<br>25% methyl methacrylate<br>22% 2-(t-butylamino)ethyl methacrylate<br>20% 2-(dimethylamino)ethyl methacrylate | 14 | 12 | 99% | 99% |
| 77 | 34% n-butyl acrylate<br>26% methyl methacrylate<br>40% 2-(dimethylamino)ethyl methacrylate | 20 | 12 | 100% | 100% |

As shown in Tables 4-7, image adhesion to the amine-containing copolymers was significantly greater than to copolymers lacking an amine functionality (Entries 54, 60, 66 and 72). Moreover, the amine-containing copolymers afforded very high adhesion for both 100% Black and 290% Photo Black toners. In contrast, copolymers lacking an amine functionality afforded considerably lower image adhesion for the 290% Photo Black toner.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the

What is claimed is the following:

1. A primer composition comprising:
an emulsion-polymerized amine-functionalized copolymer dispersed as an emulsion in an aqueous fluid having a pH of about 7.5 to about 10 and containing a starch and an anionic surfactant, a neutral surfactant or any combination thereof, the amine-functionalized copolymer having an amine number of about 70 to about 140 mg KOH/g copolymer in the emulsion and a glass transition temperature of about 0° C. to about 50° C.;
wherein the amine-functionalized copolymer comprises a polymerized reaction product of:
one or more first ethylenically unsaturated monomers lacking an amine group; and
one or more second ethylenically unsaturated monomers bearing at least one amine group, the at least one amine group comprising a side chain of the amine-functionalized copolymer.

2. The primer composition of claim 1, wherein a cationic surfactant is not present in the aqueous fluid.

3. The primer composition of claim 1, further comprising:
an adhesion promoter differing from the amine-functionalized copolymer dispersed in the aqueous fluid.

4. A primer composition comprising:
an aqueous fluid having a pH of about 7.5 to about 10 and containing a starch and an anionic surfactant, a neutral surfactant, or any combination thereof; and
an amine-functionalized copolymer dispersed as an emulsion in the aqueous fluid, the amine-functionalized copolymer having an amine number of about 10 to about 180 mg KOH/g copolymer in the emulsion;
wherein the amine-functionalized copolymer comprises a polymerized reaction product of:
one or more first ethylenically unsaturated monomers lacking an amine group; and
one or more second ethylenically unsaturated monomers bearing at least one amine group, the at least one amine group comprising a side chain of the amine-functionalized copolymer.

5. The primer composition of claim 4, further comprising:
an adhesion promoter differing from the amine-functionalized copolymer dispersed in the aqueous fluid.

6. The primer composition of claim 4, wherein the amine-functionalized copolymer further comprises at least one monomer unit bearing a side chain carboxylic acid.

7. The primer composition of claim 4, wherein the amine number ranges from about 70 to about 140 mg KOH/g copolymer in the emulsion.

8. The primer composition of claim 4, wherein a cationic surfactant is not present in the aqueous fluid.

9. The primer composition of claim 4, wherein the one or more first ethylenically unsaturated monomers comprise at least one monomer selected from the group consisting of an alkyl or cycloalkyl (meth)acrylate, n-butyl (meth)acrylate, methyl (meth)acrylate, ethyl (meth)acrylate, 2-ethylhexyl (meth)acrylate, isobornyl (meth)acrylate, cyclohexyl (meth)acrylate, styrene, a substituted styrene, a diene, 1,3-butadiene, isoprene, a vinyl ester, vinyl acetate, a nitrile, (meth)acrylonitrile, an olefinically unsaturated halide, vinyl chloride, vinyl bromide, hydroxyethyl (meth)acrylate, hydroxylpropyl (meth)acrylate; (meth)acrylamide, a substituted (meth)acrylamide, N-methylol (meth)acrylamide, diacetone acrylamide, allyl methacrylate, divinyl benzene, alkylene glycol di(meth)acrylates, and any combination thereof.

10. The primer composition of claim 4, wherein the one or more second ethylenically unsaturated monomers comprise at least one monomer selected from the group consisting of 2-(dimethylamino)ethyl methacrylate, 2-(diethylamino)ethyl methacrylate, 2-(tert-butylamino)ethyl methacrylate, and any combination thereof.

11. The primer composition of claim 4, wherein the amine-functionalized copolymer comprises a first portion of amine groups that are protonated and a second portion of amine groups that are unprotonated.

12. The primer composition of claim 4, wherein the amine-functionalized copolymer has a glass transition temperature of about 0° C. to about 50° C.

13. A coated substrate comprising:
a base substrate; and
a primer coating disposed upon a surface of the base substrate, the primer coating being formed upon the surface of the base substrate through evaporation of a primer composition;
wherein the primer composition comprises an aqueous fluid having a pH of about 7.5 to about 10; a starch; an anionic surfactant, a neutral surfactant, or any combination thereof; and an amine-functionalized copolymer dispersed as an emulsion in the aqueous fluid and having an amine number of about 10 to about 180 mg KOH/g copolymer in the emulsion;
wherein the primer coating comprises the amine-functionalized copolymer, the starch, and the anionic surfactant, the neutral surfactant, or any combination thereof; and
wherein the amine-functionalized copolymer comprises a polymerized reaction product of:
one or more first ethylenically unsaturated monomers lacking an amine group; and
one or more second ethylenically unsaturated monomers bearing at least one amine group, the at least one amine group comprising a side chain of the amine-functionalized copolymer.

14. The coated substrate of claim 13, wherein the base substrate comprises a polymeric substrate or a paper substrate.

15. The coated substrate of claim 13, wherein the base substrate comprises a paper substrate.

16. The coated substrate of claim 13, wherein the primer coating has a coating weight ranging from about 0.05 g/m$^2$ to about 1.5 g/m$^2$.

17. The coated substrate of claim 13, wherein the amine-functionalized copolymer has a glass transition temperature of about 0° C. to about 50° C.

18. The coated substrate of claim 13, wherein the primer coating lacks a cationic surfactant.

19. The coated substrate of claim 13, further comprising:
a toner deposited upon the primer coating.

20. A method comprising:
combining one or more first ethylenically unsaturated monomers lacking an amine group with one or more second ethylenically unsaturated monomers bearing at least one amine group in an aqueous fluid having a pH of about 7.5 to about 10 and containing a starch and an anionic surfactant, a neutral surfactant, or any combination thereof; and
forming an amine-functionalized copolymer in an emulsion polymerization reaction of the one or more first ethylenically unsaturated monomers and the one or more second ethylenically unsaturated monomers conducted in the aqueous fluid, thereby providing a primer composition comprising the amine-functionalized copolymer dispersed as an emulsion in the aqueous fluid;

wherein the amine-functionalized copolymer has an amine number of about 10 to about 180 mg KOH/g copolymer in the emulsion.

21. The method of claim 20, further comprising:

disposing the primer composition upon a base substrate; and evaporating the aqueous fluid to leave a primer coating comprising the amine-functionalized copolymer disposed upon the base substrate.

22. The primer composition of claim 1, wherein the aqueous fluid has a pH of about 8.5 to about 10.

23. The primer composition of claim 4, wherein the aqueous fluid has a pH of about 8.5 to about 10.

24. The method of claim 20, wherein the aqueous fluid has a pH of about 8.5 to about 10.

* * * * *